(12) United States Patent
Ishiguro et al.

(10) Patent No.: US 12,521,755 B2
(45) Date of Patent: Jan. 13, 2026

(54) APPARATUS FOR MANUFACTURING COATED FILM USING SUCTION ROLLS FOR TENSION CONTROL

(71) Applicant: THE JAPAN STEEL WORKS, LTD., Tokyo (JP)

(72) Inventors: Ryo Ishiguro, Tokyo (JP); Satoru Nakamura, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 17/771,250

(22) PCT Filed: Jul. 22, 2020

(86) PCT No.: PCT/JP2020/028569
§ 371 (c)(1),
(2) Date: Apr. 22, 2022

(87) PCT Pub. No.: WO2021/079580
PCT Pub. Date: Apr. 29, 2021

(65) Prior Publication Data
US 2022/0410205 A1 Dec. 29, 2022

(30) Foreign Application Priority Data
Oct. 23, 2019 (JP) ................................. 2019-192435

(51) Int. Cl.
*H01M 50/449* (2021.01)
*B05B 12/12* (2006.01)
(Continued)

(52) U.S. Cl.
CPC ................ *B05D 1/28* (2013.01); *B05B 12/12* (2013.01); *B05C 1/0826* (2013.01); *B05C 9/14* (2013.01);
(Continued)

(58) Field of Classification Search
CPC ........... B05C 1/0826; B05C 9/14; B05D 1/28; B05D 3/04; F26B 21/004; F26B 3/02;
(Continued)

(56) References Cited

U.S. PATENT DOCUMENTS 5,044,938 A * 9/1991 Tanabe .................. F26B 21/004
432/24
5,394,622 A * 3/1995 Evans ..................... F26B 13/10
34/496

(Continued)

FOREIGN PATENT DOCUMENTS

CN 106216197 A 12/2016
CN 108348957 A 7/2018
(Continued)

OTHER PUBLICATIONS

Office Action issued Feb. 4, 2023, in Chinese Patent Application No. 202080065208.5.
(Continued)

*Primary Examiner* — Karl Kurple
(74) *Attorney, Agent, or Firm* — Potomac Law Group, PLLC

(57) ABSTRACT

A coated film having good characteristics is manufactured. A method for manufacturing the coated film includes: (a) a step of applying a coating liquid 20a to a first surface of a base material 1 unwound from an unwinding unit UW; (b) a step of forming a coating layer 3b on the first surface of the base material 1 by drying the coating liquid (coating film 3a) on the base material 1; and (c) a step of winding the base material 1 on which the coating layer 3b has been formed in a winding unit WD. Also, the base material 1 is continuously arranged from the unwinding unit UW to the winding unit WD, tension cut of the base material 1 is performed by a first suction roll SR after the base material 1 is taken out from the unwinding unit UW and before the step (b), and tension cut
(Continued)

of the base material 1 on which the coating layer 3b has been formed is performed by a second suction roll SR before the step (c).

7 Claims, 13 Drawing Sheets

(51) Int. Cl.
| | | |
|---|---|---|
| *B05C 1/08* | (2006.01) | |
| *B05C 9/14* | (2006.01) | |
| *B05C 11/06* | (2006.01) | |
| *B05D 1/28* | (2006.01) | |
| *B05D 3/04* | (2006.01) | |
| *H01M 50/403* | (2021.01) | |
| *H01M 50/489* | (2021.01) | |

(52) U.S. Cl.
CPC ............... *B05C 11/06* (2013.01); *B05D 3/04* (2013.01); *H01M 50/403* (2021.01); *H01M 50/449* (2021.01); *H01M 50/489* (2021.01)

(58) Field of Classification Search
CPC ........ F26B 34/42; F26B 13/10; F26B 13/108; H01M 4/0471; H01M 4/0404
See application file for complete search history.

(56) References Cited

U.S. PATENT DOCUMENTS

| | | | | |
|---|---|---|---|---|
| 6,684,875 | B1* | 2/2004 | Schjerven, Sr. | ....... A21B 1/245 |
| | | | | 126/116 A |
| 6,712,937 | B1* | 3/2004 | Oechsle | ................. F26B 25/22 |
| | | | | 162/254 |
| RE43,035 | E* | 12/2011 | Schjerven, Sr. | ........ F24C 3/128 |
| | | | | 126/116 A |
| 8,196,312 | B2* | 6/2012 | Taguchi | .................. F26B 13/10 |
| | | | | 159/7 |
| 8,541,055 | B2* | 9/2013 | Kutilek | ................. C03C 17/005 |
| | | | | 427/255.31 |
| 9,662,914 | B2* | 5/2017 | Kawakami | ............... B41J 15/16 |
| 11,117,154 | B2* | 9/2021 | Nihart | ..................... B05B 16/40 |
| 2004/0191419 | A1 | 9/2004 | Oki et al. | |
| 2004/0206457 | A1* | 10/2004 | Asai | ......................... H05K 3/00 |
| | | | | 156/384 |
| 2007/0017331 | A1* | 1/2007 | Kawai | ..................... B26D 7/10 |
| | | | | 83/13 |
| 2010/0058609 | A1* | 3/2010 | Taguchi | .................. F26B 13/10 |
| | | | | 34/443 |
| 2012/0328752 | A1* | 12/2012 | Green | ....................... A23L 5/15 |
| | | | | 426/523 |
| 2013/0196040 | A1* | 8/2013 | Green | .................... A21D 13/40 |
| | | | | 426/549 |
| 2015/0255780 | A1* | 9/2015 | Tsuchiya | ............. H01M 4/0471 |
| | | | | 34/236 |
| 2018/0309104 | A1 | 10/2018 | Shin et al. | |
| 2023/0128999 | A1* | 4/2023 | Jeong | ..................... F26B 21/10 |
| | | | | 34/446 |

FOREIGN PATENT DOCUMENTS

| | | | | | |
|---|---|---|---|---|---|
| JP | | 2003-010753 | A | 1/2003 | |
| JP | | 2004-290776 | A | 10/2004 | |
| JP | | 2006-341170 | A | 12/2006 | |
| JP | | 2008-299213 | A | 12/2008 | |
| JP | | 2011-064406 | A | 3/2011 | |
| JP | | 2015-065110 | A | 4/2015 | |
| JP | | 2016-183209 | A | 10/2016 | |
| JP | | 2016-224334 | A | 12/2016 | |
| JP | | 6040829 | B2 | 12/2016 | |
| JP | | 2016224334 | | * 12/2016 | ............... G02B 5/16 |
| JP | | 2017-068900 | A | 4/2017 | |

OTHER PUBLICATIONS

International Search Report from International Patent Application No. PCT/JP2020/028569, Oct. 20, 2020.
Office Action issued Apr. 18, 2023, in Japanese Patent Application No. 2019-192435.
Decision of Rejection issued Jun. 19, 2024, in Taiwanese Patent Application No. 109126684.
Office Action issued Sep. 2, 2024, in Korean Patent Application No. 10-2022-7013271.
Office Action issued Jan. 4, 2024, in Taiwanese Patent Application No. 109126684.
Decision of Refusal issued Nov. 30, 2023, in Chinese Patent Application No. 202080065208.5.
Extended European Search Report issued Jul. 9, 2024, in European Patent Application No. 20878067.6.
Office Action issued Feb. 10, 2025, in Taiwanese Patent Application No. 109126684.
Office Action issued Jul. 20, 2023, in Chinese Patent Application No. 202080065208.5.

* cited by examiner (A)

(B)

(C)

(D)

(A)

(B)

(A)

(B)

(A)

(B)

(A)

(B)

(C)

APPARATUS FOR MANUFACTURING COATED FILM USING SUCTION ROLLS FOR TENSION CONTROL

TECHNICAL FIELD

The present invention relates to a method for manufacturing a coated film and an apparatus for manufacturing a coated film, and particularly relates to a method and an apparatus for manufacturing a coated film used in a separator of a battery or the like.

BACKGROUND ART

In recent years, batteries such as lithium ion batteries have been actively used for automobiles and infrastructure. In a battery such as a lithium ion battery, a positive electrode material and a negative electrode material are separated by a porous film called a separator. The separator has, for example, a plurality of micropores through which lithium ions can pass, and charging and discharging can be repeated by the lithium ions moving between the positive electrode material and the negative electrode material through the pores. As described above, the separator has a role of separating the positive electrode material and the negative electrode material to prevent a short circuit.

In addition, when the temperature inside the battery becomes high for some reason, the micropores of the separator are closed to stop the movement of lithium ions, thereby stopping the battery function (shutdown function).

As described above, the separator plays a role of a battery safety device, and it is important to improve the mechanical strength and heat resistance of the separator.

For example, Patent Document 1 (Japanese Unexamined Patent Application Publication No. 2016-183209) discloses a technique of forming a coating layer containing inorganic particles and a binder resin composition on at least one surface of a polyolefin resin porous film.

Further, Patent Document 2 (Japanese Unexamined Patent Application Publication No. 2017-068900) discloses a technique of forming a coating layer by applying a coating liquid containing a filler and a resin binder on a polyolefin-based resin porous film and then drying the liquid.

RELATED ART DOCUMENTS

Patent Documents

Patent Document 1: Japanese Unexamined Patent Application Publication No. 2016-183209
Patent Document 2: Japanese Unexamined Patent Application Publication No. 2017-068900

SUMMARY OF THE INVENTION

Problems to be Solved by the Invention

The inventors of the present invention have conducted research and development on a coating technique for forming a coating layer on a surface of a base material in order to improve the mechanical strength and heat resistance of the base material (porous film) of the separator of the battery.

In the process of the research and development, wrinkles and drying defects occurred on the base material in the coating and drying processing of the coating liquid, and a favorable coating technique was found as a result of diligent studies on the elimination of these problems.

Other problems and novel features will be apparent from the description of this specification and accompanying drawings.

Means for Solving the Problems

A method for manufacturing a coated film disclosed in this application includes: (a) a step of applying a coating liquid to a first surface of a base material taken out from an unloading unit; (b) a step of forming a coating layer on the first surface of the base material by drying the coating liquid on the base material; and (c) a step of taking in the base material on which the coating layer has been formed in a loading unit. The base material is continuously arranged from the unloading unit to the loading unit, tension cut of the base material is performed by a first suction roll after the base material is taken out from the unloading unit and before the step (b), and tension cut of the base material on which the coating layer has been formed is performed by a second suction roll before the step (c).

An apparatus for manufacturing a coated film disclosed in this application includes: an unloading unit from which a base material is taken out; a coating unit configured to apply a coating liquid to a first surface of the base material; a drying unit configured to form a coating layer on the first surface of the base material by drying the coating liquid on the base material; and a loading unit configured to load the base material on which the coating layer has been formed. A first suction roll is arranged between the unloading unit and the drying unit, and a second suction roll is arranged between the drying unit and the loading unit.

Effects of the Invention

According to the method for manufacturing a coated film disclosed in this application, it is possible to manufacture a coated film having good characteristics.

According to the apparatus for manufacturing a coated film disclosed in this application, it is possible to manufacture a coated film having good characteristics.

BRIEF DESCRIPTIONS OF THE DRAWINGS

FIG. 1 is a diagram schematically showing a configuration of an apparatus for manufacturing a coated film according to the first embodiment;
FIG. 2 is a cross-sectional view showing a process for forming the coated film according to the first embodiment;
FIG. 3 is a diagram showing a configuration of a suction roll;
FIG. 4 is a perspective view showing a configuration of nip rolls;
FIG. 5 is a diagram schematically showing a state of a base material in the case of using the nip rolls;
FIG. 6 is a cross-sectional view showing a horizontal-type coating device;
FIG. 7 is a cross-sectional view showing a vertical-type coating device;
FIG. 8 is a cross-sectional view showing a state of a drying chamber according to the first embodiment;
FIG. 9 is a cross-sectional view showing a state of a drying chamber according to the comparative example;
FIG. 10 is a diagram showing a sample according to the comparative example 2;
FIG. 11 is a diagram showing the temperature changes in the drying chamber before and after improving the temperature control of the drying chamber;

DETAILED DESCRIPTION OF PREFERRED EMBODIMENTS

Figure 1:
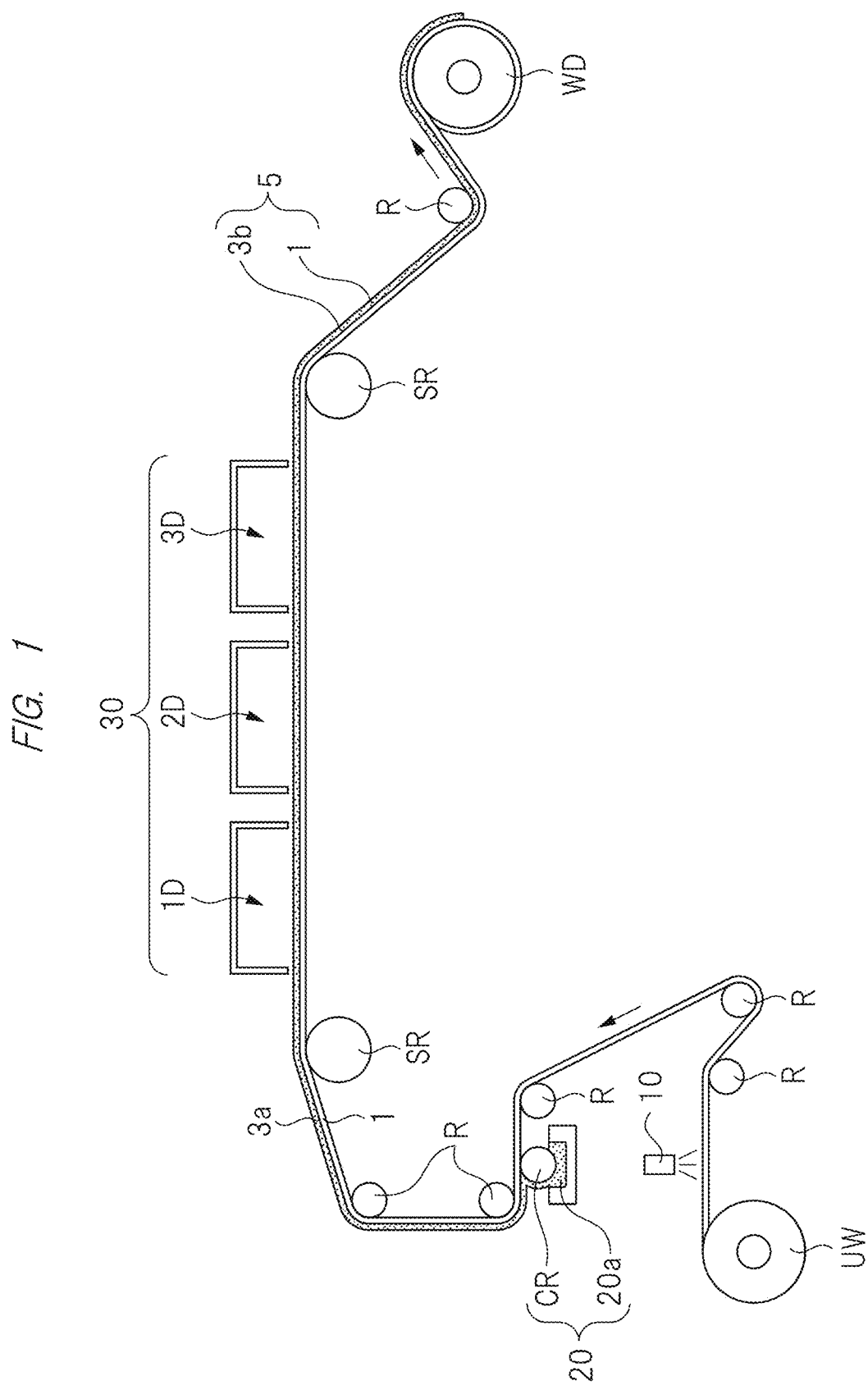

Hereinafter, embodiments will be described in detail with reference to examples and drawings. Note that members having the same function are denoted by the same reference characters throughout the drawings for describing the embodiments, and the repetitive description thereof will be omitted.

First Embodiment

Figure 2:
Figure 2:
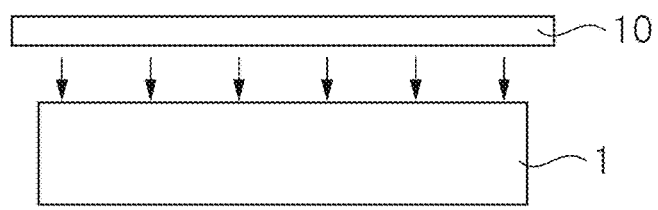
Figure 2:
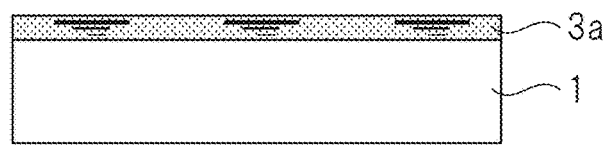
Figure 2:
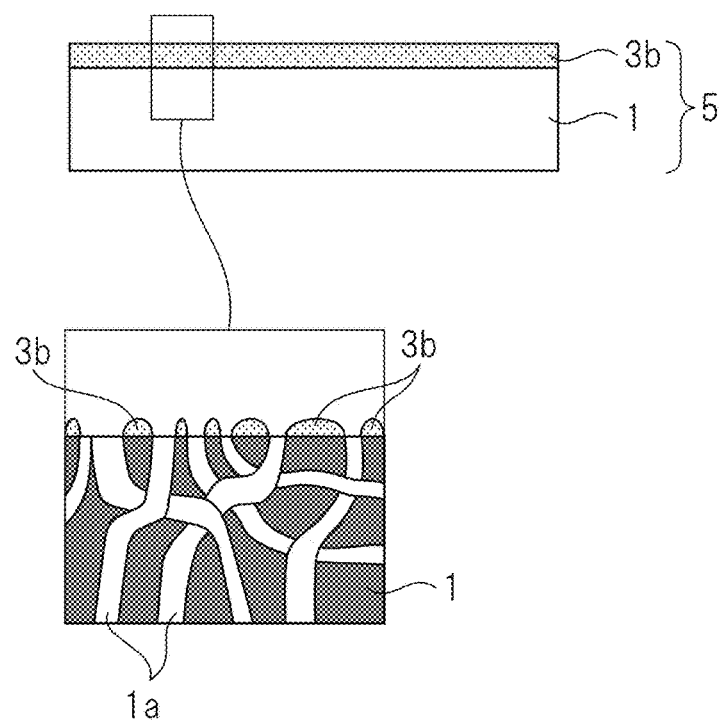

FIG. 1 is a diagram schematically showing a configuration of an apparatus for manufacturing a coated film according to the present embodiment. Also, FIG. 2 is a cross-sectional view showing a process for forming the coated film according to the present embodiment.

First, the process for forming the coated film will be described with reference to FIG. 2.

As shown in FIG. 2(A), a base material 1 made of a porous film is prepared. The porous film used as the base material 1 is made of, for example, a polyolefin-based resin. The thickness of the base material 1 is, for example, about 5 μm to 50 μm, and the width is, for example, about 200 mm to 3000 mm. The pore size distribution of micropores 1a is, for example, about 10 nm to 10 μm, and the average pore size is, for example, about 100 nm to 900 nm. The Gurley value of the base material 1 is, for example, about 100 to 300 sec/100 cc.

Next, as shown in FIG. 2(B), the surface (first surface) of the base material 1 is subjected to surface processing. For example, the surface of the base material 1 is irradiated with the corona discharge by using a corona discharge irradiation device 10. As a result, the surface of the base material 1 is modified. Specifically, the wettability of the coating liquid is enhanced on the surface of the base material 1. Note that such a surface processing is not indispensable and may be omitted depending on the type of the base material 1.

Next, as shown in FIG. 2(C), a coating liquid is applied to the surface of the base material 1 to form a coating film 3a. The coating liquid contains a filler and a dispersion medium. As the filler, inorganic substances such as alumina, silica, aluminum hydroxide, and boehmite, cellulose, and the like can be used. As the dispersion medium, an aqueous solvent or an organic solvent can be used. Further, a binder may be added. As the binder, a side chain or cyclic polymer resin, an acrylic resin, a thermoplastic fluoropolymer, or the like can be used. As the coating device, for example, a gravure coating device can be used. Further, in addition to the filler and the binder, SBR (styrene/butadiene rubber) or a polymer having high ionic conductivity may be added before use.

Next, as shown in FIG. 2(D), the coating film 3a on the base material 1 is dried to form a coating layer 3b. Through the above process, a separator (coated film) 5 composed of the base material (porous film) 1 and the coating layer 3b can be formed. The base material (porous film) 1 is provided with a large number of micropores 1a, and the coating layer 3b is provided on the surface thereof. The coating layer 3b contains, for example, cellulose and alumina. For example, as shown in the enlarged view, the coating layer 3b is not formed so as to cover all the micropores 1a of the base material 1, and the coating layer 3b itself has air permeability. For example, the Gurley value (air permeability, [sec/100 cc]) of the base material 1 (separator) on which the coating layer 3b has been formed is 10 or more and 3000 or less, and the air permeability is ensured.

The case in which the formation of the coating layer mentioned above is performed by using the apparatus (system) shown in FIG. 1 will be described below.

As shown in FIG. 1, the apparatus for manufacturing the coated film includes an unwinding unit UW for unwinding the base material 1 and a winding unit WD for winding the base material 1. The base material 1 is continuously arranged from the unwinding unit UW to the winding unit WD, and the separator (coated film) 5 is completed by forming the coating layer 3b on the surface (first surface) of the base material 1 between the unwinding unit UW and the winding unit WD. According to this apparatus for manufacturing the coated film, the scroll-shaped (rolled strip-shaped) base material 1 can be continuously processed, and the separator can be efficiently formed. In this specification, the side of the unwinding unit UW may be referred to as upstream, and the side of the winding unit WD may be referred to as downstream.

Specifically, a surface processing unit (10), a coating processing unit (20), and a drying processing unit (30) are arranged between the unwinding unit UW and the winding unit WD. The base material 1 is processed in each processing unit while being guided by a plurality of rolls (guide rolls) R, and the coating layer 3b is formed on the surface thereof. This will be described in detail below.

The base material 1 unwound from the unwinding unit UW is conveyed to the surface processing unit (10). In this surface processing unit (10), the corona discharge irradiation device 10 is arranged, and the surface of the base material 1 is irradiated with corona discharge (corona processing). As a result, the surface of the base material 1 is modified, and the wettability of the coating liquid is enhanced in the coating processing described later.

The base material 1 subjected to the surface processing (here, corona processing) is guided by the roll R and conveyed to the coating processing unit 20. Here, the base material 1 is inverted by the roll R, and the first surface subjected to the surface processing (upper side in the surface processing unit (10)) becomes the lower side in the coating processing unit (20).

In the coating processing unit (20), the gravure coating device 20 is arranged, and the coating liquid 20a is applied (coated) to the first surface of the base material 1. The coating film is indicated by 3a.

The base material 1 on which the coating film 3a has been formed is guided by the roll R and conveyed to the drying processing unit (30). Here, the base material 1 is inverted by the roll R, and the first surface on which the coating film 3a has been formed (lower side in the coating processing unit (20)) becomes the upper side in the drying processing unit (30).

In the drying processing unit (30), a drying oven (conveyor drying oven) 30 is arranged, and the liquid component of the coating film 3*a* of the base material 1 conveyed by the roll R is vaporized to form the coating layer 3*b*. For example, the drying oven 30 has three drying chambers (covers) 1D, 2D, and 3D, and heated air is introduced from a nozzle (not shown) in each drying chamber. The temperature of the heated air is controlled by a heating unit (heater or the like) (not shown).

As described above, the strip-shaped base material 1 is processed in each processing unit while being guided by the plurality of rolls (guide rolls) R.

Here, in the present embodiment, as shown in FIG. 1, suction rolls SR are provided before and after the drying processing unit (30). The tension cut of the base material 1 is performed by the suction rolls SR. By the tension cut, it is possible to adjust the tension of the base material 1 to be different between the upstream and the downstream starting from the suction roll SR as a point of origin. For example, in an apparatus having a plurality of processing units, the state of the base material (film) 1 changes depending on each processing. For example, in the coating processing unit (20), the thickness of the base material 1 changes. Further, in the drying processing unit (30), the base material 1 expands and contracts. If the base material 1 is controlled to have the same tension uniformly in the apparatus regardless of such a change in the state of the base material 1, there is a concern that the base material 1 may flutter, sag, or tear.

Therefore, for example, the tension cut is performed before and after the drying processing unit (30). As a result, the tension can be adjusted in three sections such as the section from the unwinding unit UW to the inlet of the drying processing unit (30), the section from the inlet of the drying processing unit (30) to the outlet of the drying processing unit (30), and the section from the outlet of the drying processing unit (30) to the winding unit WD.

Such tension cut can also be performed by using nip rolls described later. However, when the nip rolls that physically sandwich the base material 1 are used, they become a conveyance resistance even they are is of a driven type, and the winding tension increases. On the other hand, when the suction roll SR is used, the conveyance resistance of the base material 1 can be reduced. Here, for example, if the suction rolls SR in the apparatus are removed, the winding tension increases.

As described above, the strip-shaped base material 1 is processed in each processing unit while being guided by the plurality of rolls (guide rolls) R. At this time, if the state of the base material (film) 1 is changed by each processing, the base material 1 may be sagged or torn. Therefore, by performing the tension cut of the base material 1, it is possible to suppress the base material 1 from being sagged and torn, and the base material 1 can be processed without troubles. Further, it is not necessary to reduce the processing speed (line speed, conveyance speed) of the base material 1 in order to prevent the base material 1 from being sagged or torn, and the base material 1 can be processed at high speed.

Figure 3:
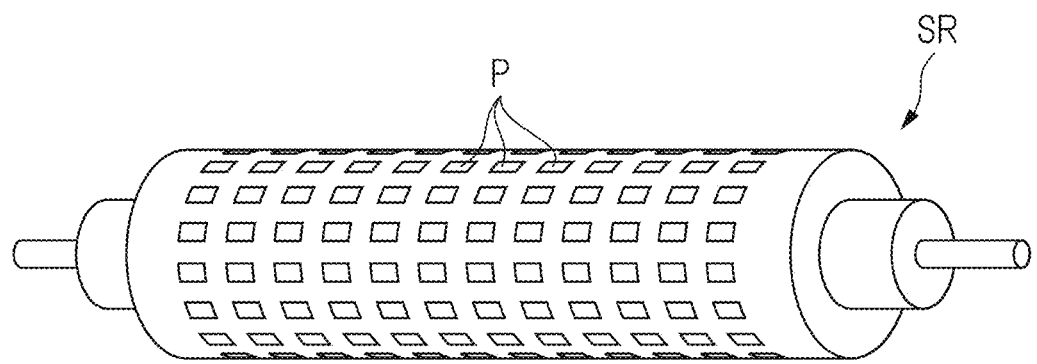
Figure 3:
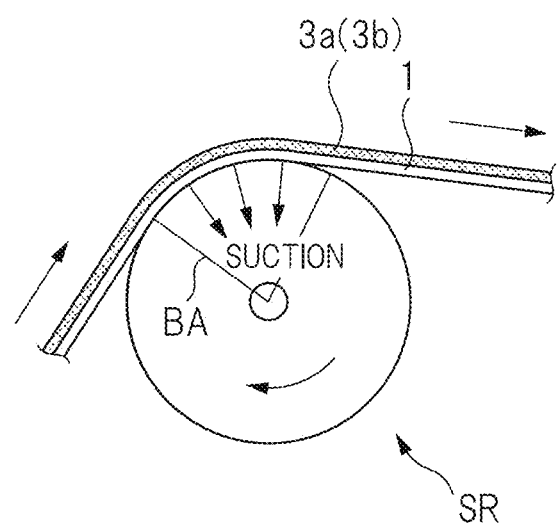

FIG. 3 is a diagram showing the configuration of the suction roll SR. FIG. 3(A) is a perspective view, and FIG. 3(B) is a cross-sectional view.

As shown in FIG. 3(A), the suction roll SR has a shaft portion and a cylindrical portion. A plurality of holes P are provided in the side surface of the cylindrical portion. Then, the cylindrical portion is connected to a suction unit (decompression pump or the like), and a partial region inside the cylindrical portion comes into a suction state when the suction roll SR is in operation. This partial region is a region BA having a fan-shaped cross section in contact with the base material 1. Therefore, as shown in FIG. 3(B), the base material 1 is sucked to the side surface of the cylindrical portion and is conveyed by the rotation of the cylindrical portion. The suction pressure (pressure of the partial region BA inside the cylindrical portion) is preferably 3 MPa or less. If it exceeds 3 MPa, the base material 1 may be dragged into the holes P of the suction roll SR. In particular, when a thin base material (10 µm or less) is used as the base material 1, the suction pressure is preferably 2.5 MPa or less, and more preferably 1.5 MP or less. The size, shape, and number of holes P provided in the suction roll SR can be changed as appropriate.

Figure 4:
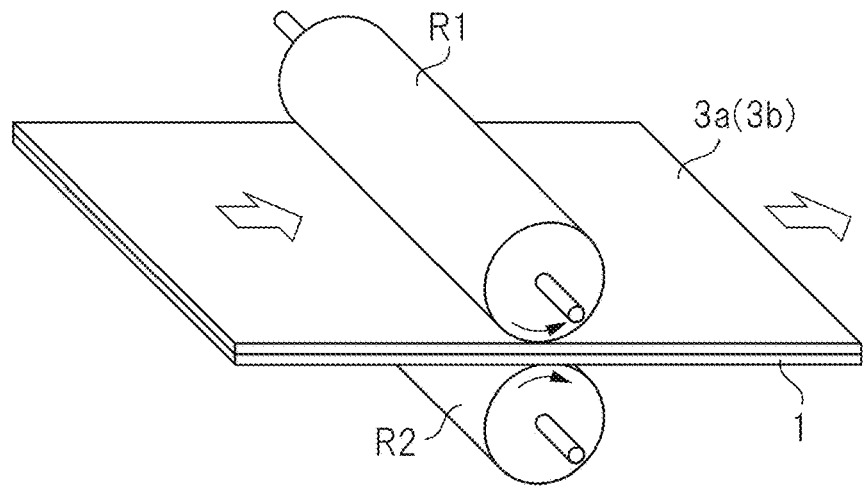

Nip rolls can be presented as an example of such a roll for tension cut (roll for tension control). FIG. 4 is a perspective view showing the configuration of the nip rolls. As shown in FIG. 4, the nip rolls have a roll R1 and a roll R2, and for example, a pressure is applied to the roll R1 toward the roll R2. In other words, the roll R1 is pressed to the roll R2. Tension cut can be performed by passing the base material 1 between the roll R1 and the roll R2.

Figure 5:
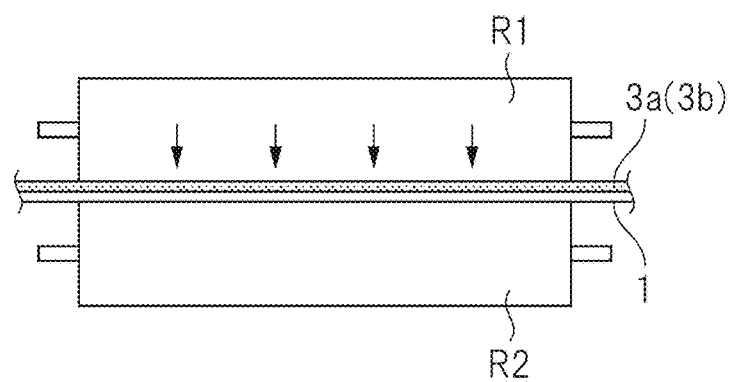
Figure 5:
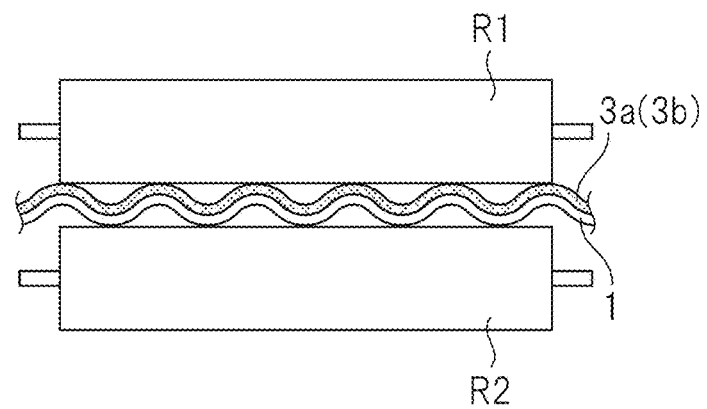

According to the study by the inventors, it was found that wrinkles were likely to occur on the base material 1 when the nip rolls (R1, R2) were used as the rolls for tension cut. FIG. 5 is a diagram schematically showing the state of the base material when the nip rolls are used. As shown in FIG. 5(A), at the moment of passing between the roll R1 and the roll R2, the base material 1 is thinned and flattened by the pressure (load, nip pressure) between the roll R1 and the roll R2. However, it is conceivable that, after passing between the roll R1 and the roll R2, the base material 1 is released from the pressure and returned to the original shape (thickness), and wrinkles are formed.

According to the inventors, although the conditions under which wrinkles did not occur were intensively studied by changing various conditions (pressure, winding tension, processing speed, etc.) by using the nip rolls (R1, R2), starting with comparative examples described later, it was found difficult to eliminate the occurrence of wrinkles. In particular, when the thickness of the base material 1 was small, since the cross-sectional area was small and the applied pressure was relatively increased, the occurrence of wrinkles was noticeable.

On the other hand, in the present embodiment, the occurrence of wrinkles can be suppressed by using the suction roll instead of the nip rolls (R1, R2). In particular, even when the base material 1 is thinned, the occurrence of wrinkles can be effectively suppressed.

(Adoption of Horizontal-Type Coating Device)

As described above, in the present embodiment, the tension cut works effectively, so that the winding tension can be suppressed as compared with the case of using the nip rolls (R1, R2).

When coating is performed at high speed in order to increase productivity, the tension of the base material 1 between the rolls increases in the apparatus in which the nip rolls (R1 and R2) are installed as described above. Further, since the base material (film) 1 is compressed in the thickness direction, the elastically deformed base material 1 is restored to its original width after passing through the nip rolls (R1 and R2), so that wrinkles are likely to occur on the base material 1.

On the other hand, if the tension between the rolls R is lowered in order to improve the wrinkles of the base material 1 having a small film thickness, air enters between the roll R and the base material 1, so that the base material 1 floats and meanders. Since the amount of air that causes the base material 1 to float increases in proportion to the conveyance speed of the base material 1, the base material 1 tends to float especially when the coating is performed at high speed.

However, when the suction roll SR is used, the tension cut functions effectively, so that the meandering caused by the excessive or insufficient tension between the rolls R and the occurrence of wrinkles caused by the physical contact as in the case of using the nip rolls are suppressed. Therefore, when the suction roll SR is used, the base material 1 can be conveyed at a higher speed than when the nip rolls (R1 and R2) are used.

Figure 6:
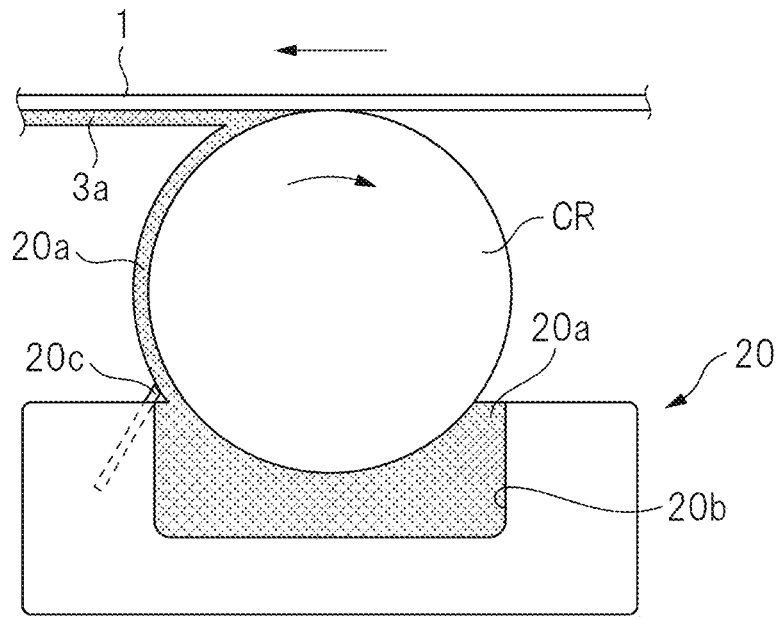

Further, since the base material 1 can be conveyed at high speed, it is not necessary to use a vertical-type coating device in the gravure coating device, and a horizontal-type coating device can be used. FIG. 6 is a cross-sectional view showing a horizontal-type coating device. Also, FIG. 7 is a cross-sectional view showing a vertical-type coating device.

The horizontal-type coating device (20) shown in FIG. 6 includes a chamber (tank) 20b for storing the coating liquid 20a, a coating roll CR, a part of which is immersed in the chamber (tank) 20b, and a blade 20c for preventing the scattering of the coating liquid 20a. The blade 20c is arranged on the side of the rotation direction of the coating roll CR (left side in FIG. 6) so as to hold the coating liquid 20a adhered to the surface of the coating roll CR.

Figure 7:
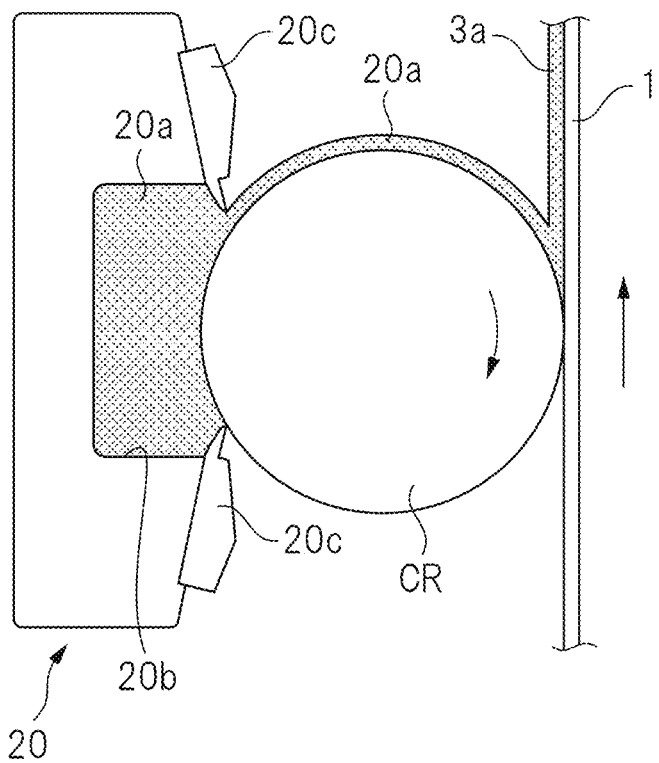

On the other hand, in the vertical-type coating device (20) shown in FIG. 7, the chamber (tank) 20b is arranged in the vertical direction (direction parallel to the gravity direction). In this case, it is necessary to hold the coating liquid 20a by two blades 20c arranged above and below the chamber (tank) 20b. Further, if the capacity of the chamber (tank) 20b is made too large, the blade that holds the coating liquid 20a bends, and the coating liquid 20a cannot be held. Accordingly, in the vertical-type coating device (20), the capacity of the chamber (tank) 20b cannot be increased, and the wear of the blade 20c itself and the wear of the coating roll CR which is in contact with the blade 20c via the coating liquid 20a are increased. As described above, the coating liquid contains a hard filler such as alumina. Therefore, the blade 20c and the coating roll CR which are in contact with each other via the coating liquid are scraped and worn. On the other hand, in the present embodiment, since the horizontal-type coating device (20) can be incorporated, the wear of the blade 20c and the coating roll CR can be reduced. Further, the capacity of the chamber (tank) 20b can be increased, and the coating liquid 20a is unlikely to run out even if high-speed processing is performed.

(Improvement of Temperature Control of Drying Oven)

As described above, since the tension cut works effectively in the present embodiment, the winding tension can be suppressed as compared with the case of using the nip rolls (R1, R2). Therefore, high-speed processing is possible. Namely, each processing can be performed while conveying the base material 1 at high speed.

Here, in the drying processing unit (30), the internal temperature of each cover (each drying chamber) is preferably uniform. However, with the high-speed conveyance of the base material 1, an accompanied flow comes in from the lower part of the cover (the gap between the side wall of the cover and the base material 1), and the temperature inside the cover may be lowered. Therefore, it is preferable to control the temperature in consideration of the accompanied flow.

Figure 8:
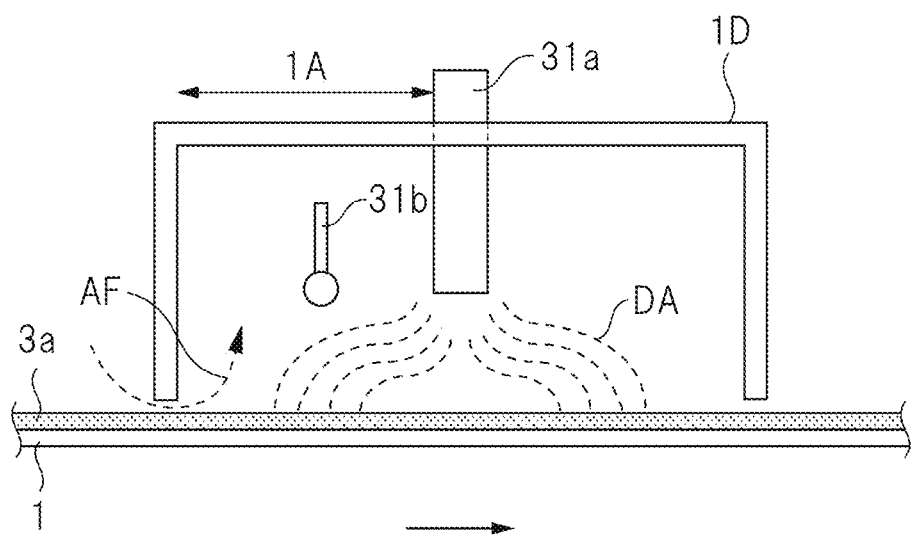
Figure 9:
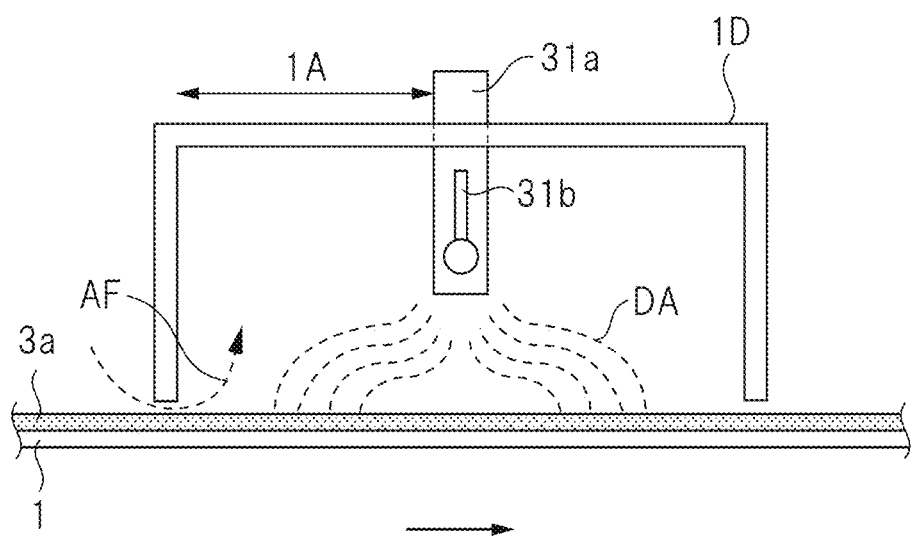

FIG. 8 is a cross-sectional view showing the state of the drying chamber in the present embodiment. FIG. 9 is a cross-sectional view showing the state of the drying chamber in the comparative example. Here, among the three drying chambers provided in the drying processing unit (30) shown in FIG. 1, the drying chamber 1D arranged at the most upstream side will be described.

As shown in FIG. 8, a nozzle 31a is provided inside the drying chamber 1D, and heated dry air (heating fluid) DA is discharged from the tip of the nozzle 31a. In other words, the heated dry air DA is blown to the base material 1 from the tip of the nozzle 31a.

For example, the nozzle 31a is provided at the center of the drying chamber. The planar shape of the nozzle 31a may be spot-shaped (circular) or line-shaped (rectangular). Here, the internal temperature of the drying chamber 1D is measured by a thermocouple 31b. A thermocouple is a temperature sensor that measures the temperature (temperature difference) based on the thermoelectromotive force at the junction between two or more types of metals. If the temperature inside the drying chamber 1D deviates from the set temperature as a result of measuring the temperature inside the drying chamber 1D by this thermocouple (temperature sensor), the temperature of the heated dry air DA is adjusted by a heater (not shown), and the temperature in the drying chamber 1D is maintained at the set temperature.

In the present embodiment, the thermocouple 31b is provided between the side wall of the drying chamber (cover) on the upstream side and the nozzle 31a (region 1A). By arranging the thermocouple 31b in this way, the temperature drop in the drying chamber 1D due to the accompanied flow AF can be appropriately corrected, and the coating film 3a formed on the surface of the base material 1 can be dried accurately. Here, the side wall of the drying chamber (cover) on the upstream side is the side wall that the base material 1 first crosses, and in other words, it is the side wall located on the upstream side, of the two side walls extending in the direction intersecting the conveyance direction.

On the other hand, for example, in the comparative example shown in FIG. 9, since the thermocouple 31b is arranged so as to be in contact with the nozzle 31a, it is not possible to appropriately correct the temperature drop in the drying chamber 1D due to the accompanied flow AF, and uneven drying tends to occur in the coating film 3a formed on the surface of the base material 1.

As described above, according to the present embodiment, a coating film (coating layer) having good characteristics can be efficiently manufactured by adopting the suction roll, adopting the horizontal-type coating device, and improving the temperature control in the drying chamber.

EXAMPLES

Hereinafter, examples will be shown in order to describe the present embodiment more specifically, but the present invention is not limited to the following examples.

A coating layer was formed on the surface of a base material (porous film made of polyethylene) to form a separator (coated film) by using the apparatus for manufacturing the coated film according to the present embodiment. Namely, a coated film (separator) was formed while performing the tension cut of the base material by using suction rolls before and after the drying processing unit. Also, a horizontal-type coating device was used, and the temperature in the drying chamber was controlled by arranging the thermocouple in the region 1A mentioned above.

COMPARATIVE EXAMPLES

A coating layer was formed on the surface of a base material to form a separator by using the apparatus for manufacturing the coated film according to the comparative example. Namely, a coated film (separator) was formed while performing the tension cut of the base material by using nip rolls before and after the drying processing unit. Also, a vertical-type coating device was used, and the temperature in the drying chamber was controlled by arranging the thermocouple on the nozzle.

With respect to the obtained samples (separators), wrinkles were visually determined, and the dry state was determined by touching with hand.

Table 1 below shows the processing conditions and determination results of each example and each comparative example.

9 μm. When the line speed was 50 m/min, the winding tension was 12 N. Here, the drying temperature was 80° C. so as to improve the dry state, but on the contrary, wrinkles occurred and the dry state was deteriorated.

Example 1

A coating layer having a film thickness of 4 μm was formed by using a base material having a film thickness of 7 μm. When the line speed was 50 m/min, the winding tension was 4 N. Also, the drying temperature was 65° C. In this case, there were no wrinkles (OK) and the dry state was good (OK).

Example 2

A coating layer having a film thickness of 4 μm was formed by using a base material having a film thickness of 5 μm. When the line speed was 30 m/min, the winding

TABLE 1

| | BASE MATERIAL THICKNESS [μm] | COATING FILM THICKNESS [μm] | LINE SPEED [m/min] | WINDING TENSION [N] | DRYING TEMPERATURE [° C.] | TENSION CONTROLLING ROLL | DRYING TEMPERATURE CONTROLLING METHOD | DRY STATE | WRINKLES |
|---|---|---|---|---|---|---|---|---|---|
| COMPARATIVE EXAMPLE 1 | 9 | 7 | 50 | 12 | 75 | NIP POLL | NOZZLE | OK | OK |
| COMPARATIVE EXAMPLE 2 | 7 | 7 | 50 | 12 | 75 | NIP ROLL | NOZZLE | X | X |
| COMPARATIVE EXAMPLE 3 | 9 | 7 | 50 | 12 | 80 | NIP ROLL | NOZZLE | X | X |
| EXAMPLE 1 | 7 | 4 | 50 | 4 | 65 | SUCTION ROLL | TEMPERATURE IN OVEN | OK | OK |
| EXAMPLE 2 | 5 | 4 | 30 | 4 | 50 | SUCTION ROLL | TEMPERATURE IN OVEN | OK | OK |
| EXAMPLE 3 | 7 | 4 | 100 | 4 | 65 | SUCTION ROLL | TEMPERATURE IN OVEN | OK | OK |

Comparative Example 1

A coating layer having a film thickness of 7 μm was formed by using a base material having a film thickness of 9 μm. When the line speed was 50 m/min, the winding tension was 12 N. Also, the drying temperature was 75° C. In this case, there were no wrinkles (OK) and the dry state was good (OK).

Comparative Example 2

Figure 10:
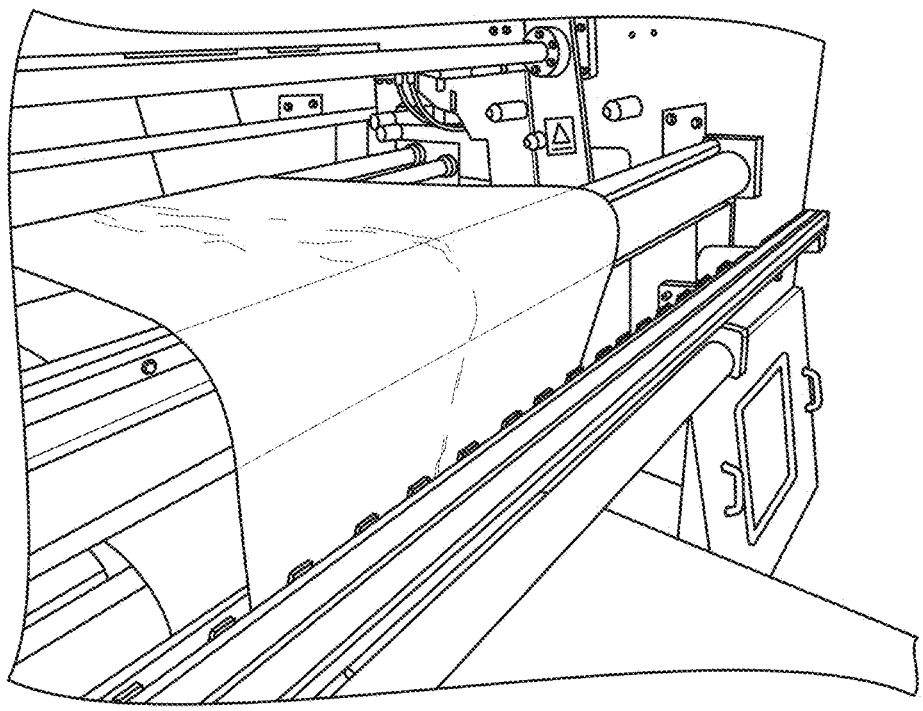
Figure 10:
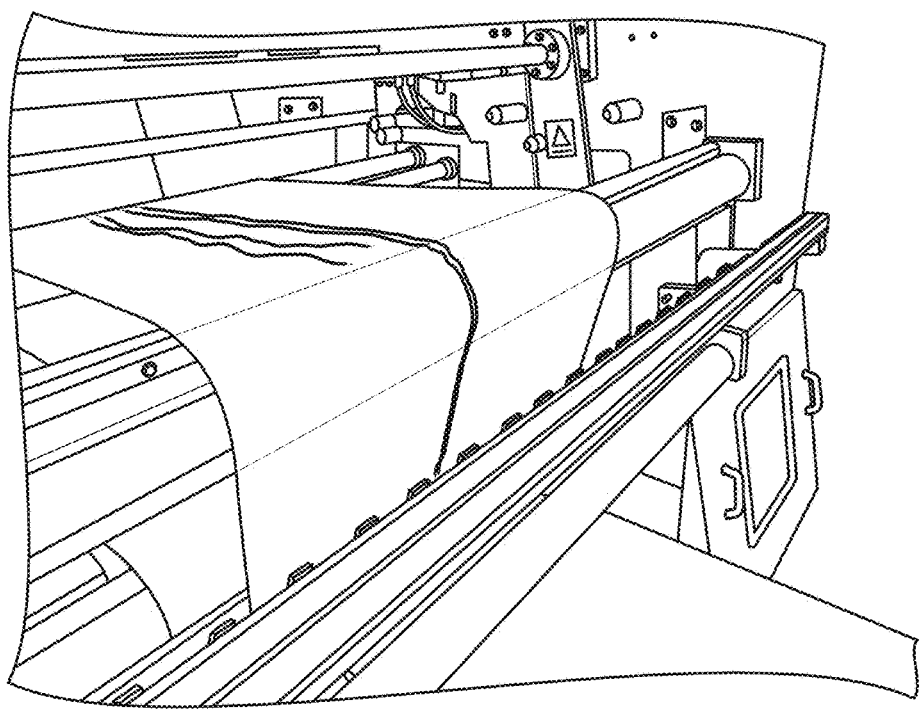

A coating layer having a film thickness of 7 μm was formed by using a base material having a film thickness of 9 μm. When the line speed was 50 m/min, the winding tension was 12 N. Also, the drying temperature was 75° C. In this case, wrinkles occurred and the dry state was bad. FIG. 10 is a diagram showing a sample of the comparative example 2. As shown in FIG. 10(A), winkles occur in the sample (separator). In FIG. 10(B), the wrinkles are clearly indicated by black lines.

Comparative Example 3

A coating layer having a film thickness of 7 μm was formed by using a base material having a film thickness of tension was 4 N. Also, the drying temperature was 50° C. In this case, there were no wrinkles (OK) and the dry state was good (OK).

Example 3

A coating layer having a film thickness of 4 μm was formed by using a base material having a film thickness of 7 μm. When the line speed was 100 m/min, the winding tension was 4 N. Also, the drying temperature was 65° C. In this case, there were no wrinkles (OK) and the dry state was good (OK).

(Gurley Value Deterioration Rate)

The Gurley value deterioration rate was determined in the samples of the comparative example 1 and the example 3. The prepared sample was cut out and measured by using a Gurley-type automatic measuring machine. Here, the time that elapsed before the air of 100 cc passed through the sample (sheet) was measured as a Gurley value. In addition, the Gurley value for the base material before the formation of the coating layer was measured in the same manner and was defined as a reference Gurley value, and the Gurley value deterioration rate [((Gurley value−reference Gurley value)/reference Gurley value)×100%] was calculated.

The Gurley value deterioration rate of the sample of the comparative example 1 was 9.1%. On the other hand, the Gurley value deterioration rate of the sample of the example 3 was 8.5%. The Gurley value deterioration rate of the sample of the example 3 achieved the target of 10% or less, and was better than that of the comparative example 1.

Summary 1

In the comparative example 1, when the film thickness of the based material was as thick as 9 μm, a coated film (separator) with no wrinkles and a good dry state was obtained even in the apparatus of the comparative example. However, when the film thickness was as thin as 7 μm, wrinkles occurred and the dry state was bad in the apparatus of the comparative example. Further, in the comparative example 3, even when the film thickness of the base material was as thick as 9 μm, wrinkles occurred and the dry state was deteriorated on the contrary in the case of the drying method shown in FIG. 9.

On the other hand, in the example 1, although the film thickness of the base material was as thin as 7 μm, a coated film (separator) with no wrinkles and a good dry state was obtained.

In the example 2, even when the film thickness of the base material was further reduced to 5 μm, a coated film (separator) with no wrinkles and a good dry state was obtained.

In the example 3, even when the line speed was 100 m/min, a coated film (separator) having no wrinkles and a good dry state was obtained.

Further, in the examples 1 to 3, it was confirmed that the winding tension was as small as 4 N, and there was no problem even if the above-mentioned horizontal-type coating device was adopted. Also, it was confirmed that the line speed could be increased to 100 m/min or more because the winding tension was as small as 4 N.

Further, the temperature control of the drying oven functioned well, and the dry state was good in the examples 1 to 3 even though the drying temperatures (set temperatures) were lower than those of the comparative examples 1 to 3.

Figure 11:
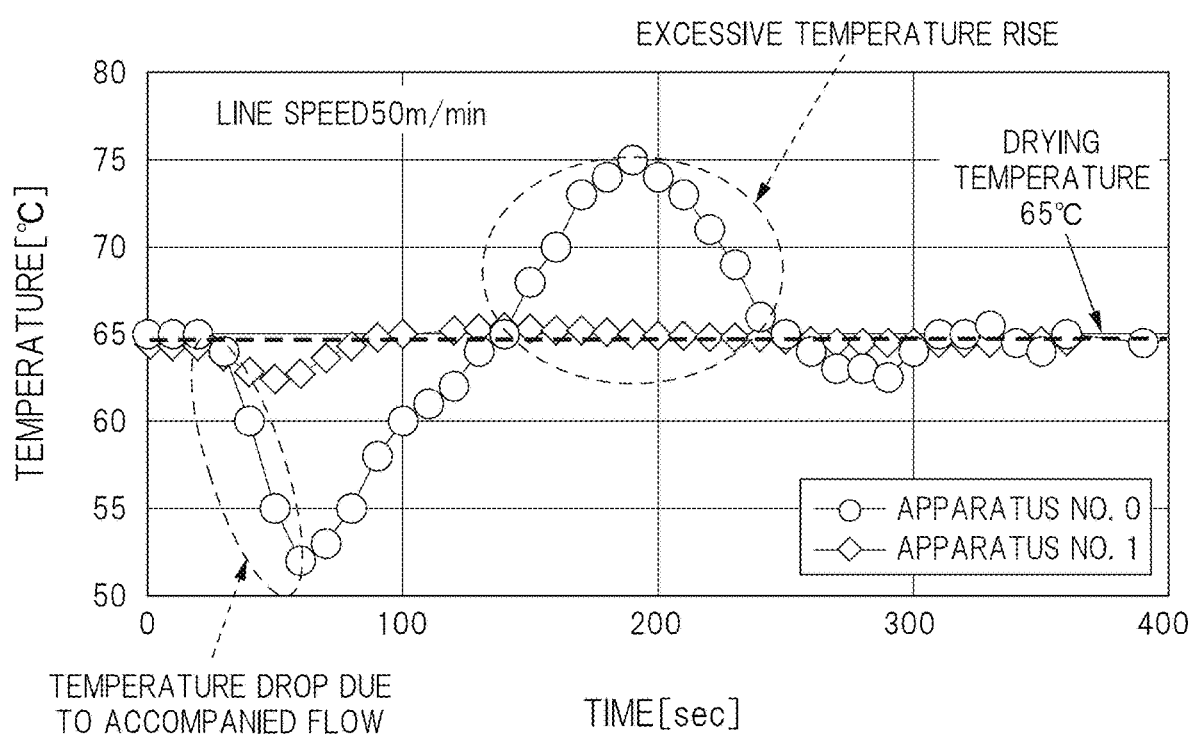

FIG. 11 is a diagram showing the temperature changes in the drying chamber before and after improving the temperature control of the drying chamber. The vertical axis represents the temperature and the horizontal axis represents the time. The apparatus No. 1 (diamond mark) indicates the case after the improvement, that is, the case where the drying temperature was controlled by arranging the thermocouple 31b between the side wall of the drying chamber on the upstream side and the nozzle 31a (region 1A), and the apparatus No. 0 (circular mark) indicates the case before the improvement, that is, the case where the drying temperature was controlled by arranging the thermocouple 31b so as to be in contact with the nozzle 31a.

As shown in the figure, in the graph before the improvement, the temperature dropped sharply due to the influence of the accompanied flow, and since the temperature was controlled based on this drop, the excessive temperature rise occurred. On the other hand, when the nozzle 31a was arranged in the region 1A mentioned above, the temperature drop due to the influence of the accompanied flow was slight, and the drying processing was performed at the set temperature of about 65° C.

By such temperature control, good drying could be performed without wrinkles even at the line speed of 100 m/min as shown in the example 3.

Summary 2

From the above-described examples and comparative examples, it was found that the coated film could be favorably formed by using the method and apparatus for manufacturing a coated film according to the present embodiment even when the film thickness of the base material was 9 μm or less, more preferably less than 9 μm, and still more preferably 7 μm or less. In particular, with respect to the separator, in order to improve the battery characteristics (particularly, the battery capacity), it has been desired to improve the strength and durability of the separator while reducing the thickness thereof. Therefore, it was found that it was effective to use the method and apparatus for manufacturing a coated film according to the present embodiment as the method and apparatus for manufacturing such a thin and high-strength separator.

From the above-described examples and comparative examples, it was found that the winding tension could be 12 N or less, more preferably less than 12 N, and still more preferably 4 N or less. As a result, it was found that the horizontal-type coating device could be adopted and a separator with good characteristics could be efficiently manufactured.

From the above-described examples and comparative examples, it was found that it was possible to achieve the processing speed (line speed) of the base material of 30 m/min or more, more preferably 50 m/min or more, and still more preferably 100 m/min or more, and a separator having good characteristics could be efficiently manufactured.

From the above-described examples and comparative examples, it was found that a favorable drying processing could be performed even when the drying temperature was relatively low, for example, less than 75° C., more preferably 65° C. or lower, and still more preferably 50° C. or lower. In particular, it was found that good drying processing could be performed because of the synergistic effect of the improvement of the temperature control and the adoption of the suction roll. Further, it was found that the influence of the accompanied flow could be reduced and favorable drying processing could be performed even when the processing was performed at a processing speed of 30 m/min or more, more preferably 50 m/min or more, and still more preferably 100 m/min or more.

Second Embodiment

In the present embodiment, an application example of the separator described in the first embodiment will be described. The separator can be applied to, for example, a lithium ion battery.

Figure 12:
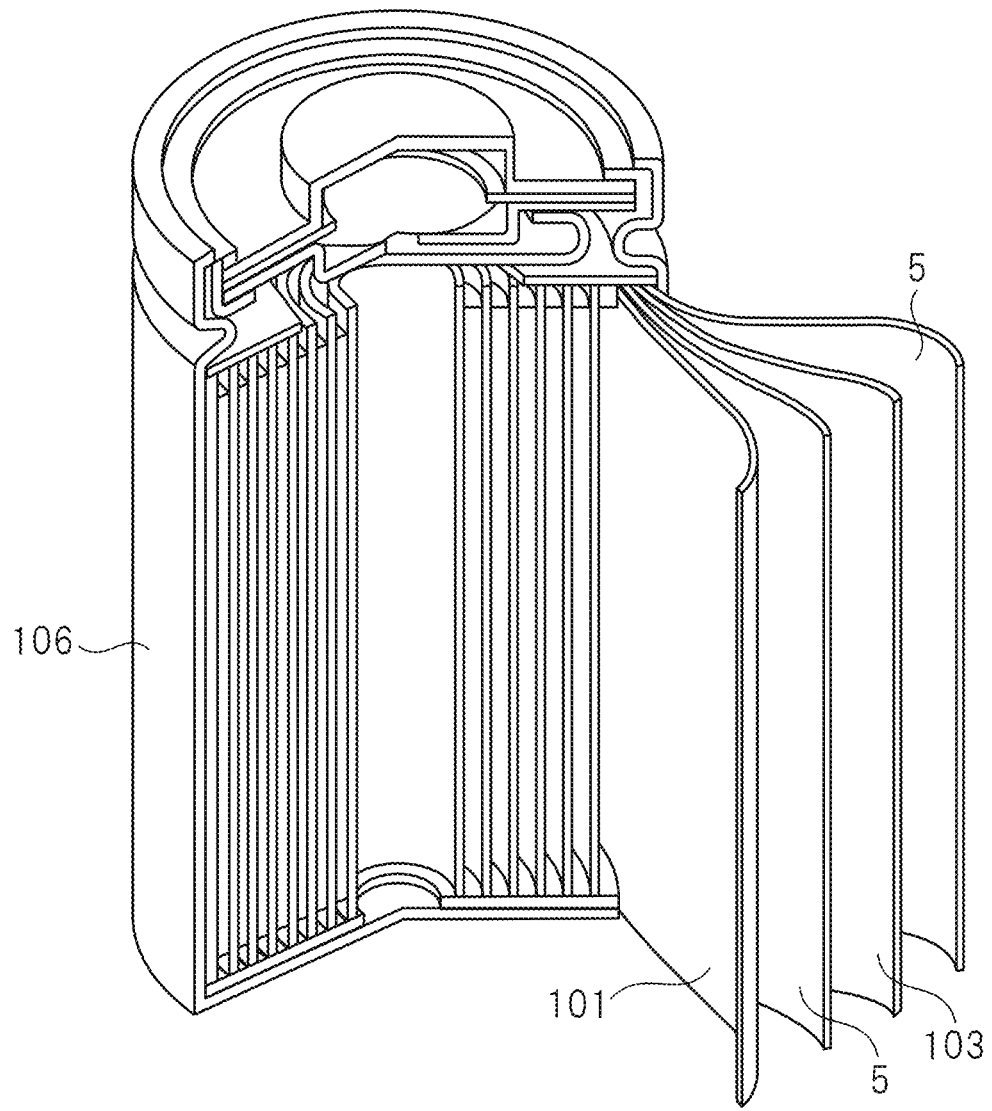
FIG. 12 is a cross-sectional perspective view showing a configuration of a lithium ion battery.

FIG. 12 is a cross-sectional perspective view showing the configuration of a lithium ion battery. The lithium ion battery shown in FIG. 12 has a cylindrical can 106, and an electrode group in which strip-shaped positive electrode material 101 and negative electrode material 103 are wound with the separator 5 interposed therebetween is housed in the can 106. A positive electrode current collecting tab on the upper end surface of the electrode group is joined to a positive electrode cap. A negative electrode current collecting tab on the lower end surface of the electrode group is joined to a bottom portion of the can 106. Note that an insulating coating (not shown) is provided on the outer peripheral surface of the can 106. Further, an electrolytic solution (not shown) is injected in the can 106. Although a cylindrical battery has been described here as an example, there is no limitation on the configuration of the battery, and for example, a square-type battery or a laminated-type battery can be used.

As described above, the lithium ion battery has the positive electrode material 101, the negative electrode material 103, the separator 5, and the electrolytic solution, and the separator 5 is arranged between the positive electrode material 101 and the negative electrode material 103. The separator 5 has a large number of micropores. For example, when charging, that is, when a charger is connected between the positive electrode (positive electrode cap) and the negative electrode (bottom portion of the can 106), the lithium ions inserted in the positive electrode active material are desorbed and released into the electrolytic solution. The lithium ions released into the electrolytic solution move in the electrolytic solution, pass through the micropores of the separator, and reach the negative electrode. The lithium ions that have reached the negative electrode are inserted into the negative electrode active material that constitutes the negative electrode.

In this way, the lithium ions move back and forth between the positive electrode material and the negative electrode material through the micropores (not shown) provided in the separator 5, so that it is possible to perform charging and discharging repeatedly. By using the separator formed by using the method for manufacturing a coated film and the apparatus for manufacturing a coated film described in the first embodiment as this separator, the characteristics of the lithium ion battery can be improved. In addition, it is possible to form a lithium ion battery efficiently.

Third Embodiment

In the present embodiment, a method for manufacturing the base material (porous film) described in the first embodiment will be described. For example, the base material (porous film) described in the first embodiment can be manufactured by the following process.

Figure 13:
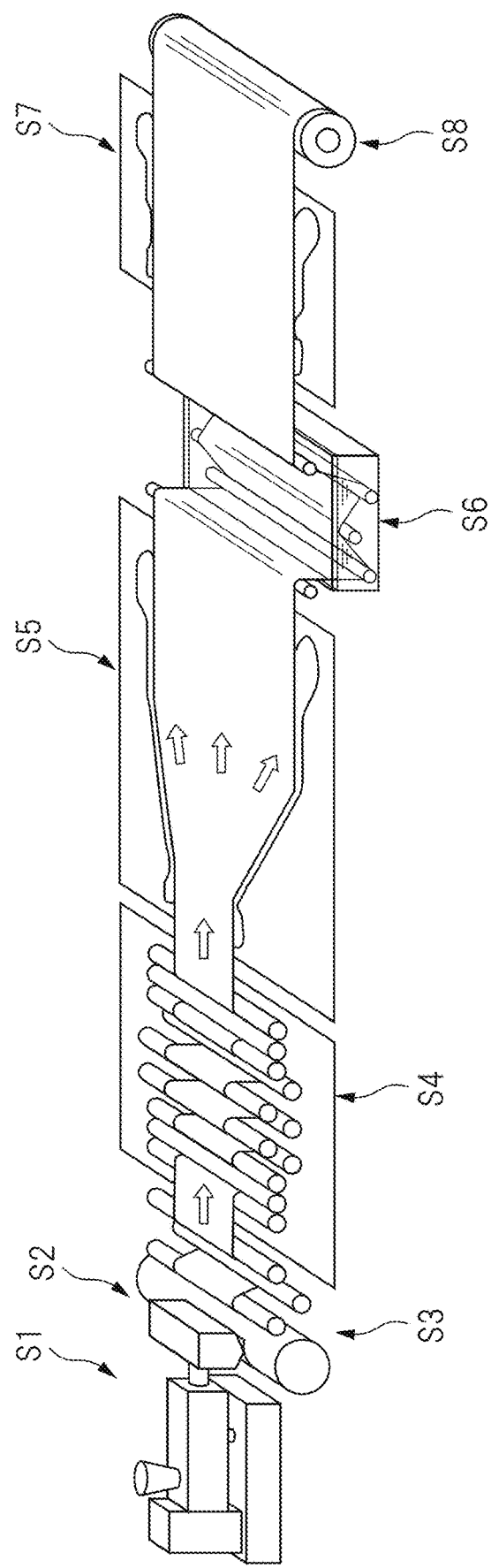
FIG. 13 is a schematic diagram showing a configuration of an apparatus for manufacturing a porous film.

FIG. 13 is a schematic diagram showing the configuration of an apparatus (system) for manufacturing a porous film. For example, a plasticizer (liquid paraffin) and a polyolefin (for example, polyethylene) are put into a raw material supply unit of a twin screw kneading extruder (S1) of FIG. 13, and the plasticizer and the polyolefin are kneaded in a kneading unit. The kneading conditions are, for example, 180° C. and 12 minutes, and the rotation speed of the shafts is 100 rpm.

The kneaded material (molten resin) is conveyed from a discharge unit to a T-die S2, and the molten resin is cooled by a raw fabric cooling device S3 while being extruded from the slit of the T-die S2, thereby forming a thin-film resin molding.

Next, the thin-film resin molding is stretched in the longitudinal direction by a first stretching device S4, and is further stretched in the lateral direction by a second stretching device S5.

Then, the stretched thin film is immersed in an organic solvent (for example, methylene chloride) in an extraction tank S6. In the stretched thin film, the polyolefin (for example, polyethylene) and the plasticizer (paraffin) are in a phase-separated state. Specifically, the plasticizer (paraffin) forms nano-sized islands. This nano-sized plasticizer (paraffin) is removed (degreased) by the organic solvent (for example, methylene chloride) in the extraction tank S6. In this way, a porous film can be formed.

Thereafter, by a third stretching device S7, the thin film is dried and fixed by heat while being stretched in the lateral direction, and the internal stress during stretching is relaxed. Next, the porous film conveyed from the third stretching device S7 is wound by a winding device S8.

In this way, the porous film (base material of the first embodiment) can be manufactured.

For example, the scroll-shaped porous film wound by the winding device S8 can be set in the unwinding unit UW of the first embodiment (FIG. 1), and the coating layer 3b can be formed on the surface thereof.

Further, for example, the apparatus of the first embodiment (FIG. 1) may be incorporated between the third stretching device S7 and the winding device S8. Namely, the coating layer 3b may be formed by performing the corona processing on the surface of the porous film conveyed from the third stretching device S7, applying the coating liquid, and then drying the liquid. In this case, the winding device S8 corresponds to the winding unit WD of FIG. 1.

In this way, the separator may be formed by a continuous apparatus (system) from the formation of the porous film to the formation of the coating layer.

Fourth Embodiment

In the present embodiment, various application examples will be described.

Application Example 1

Figure 14:
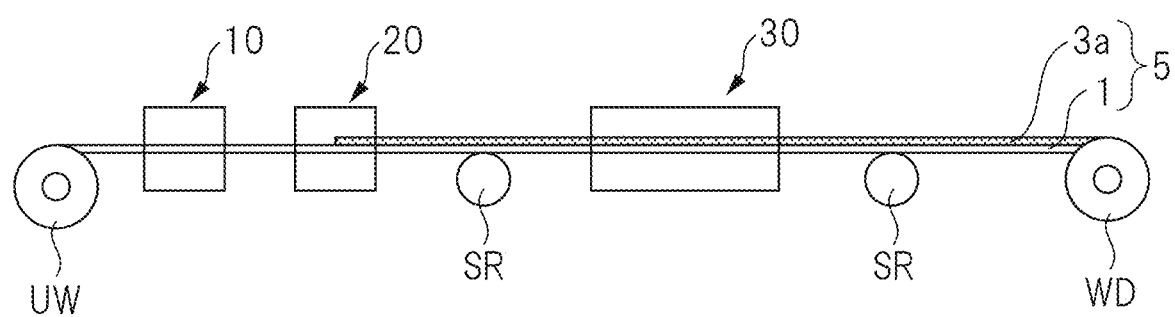
FIG. 14 is a simplified schematic diagram showing the configuration of the apparatus for manufacturing the coated film according to the first embodiment.
Figure 15:
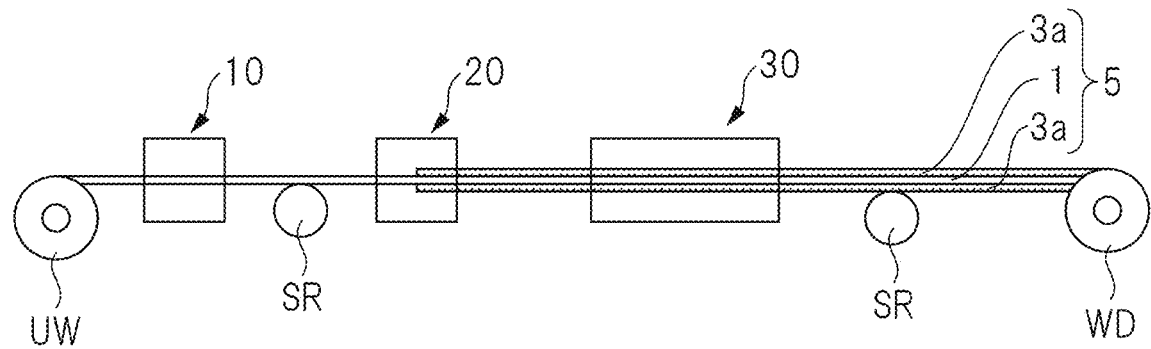
FIG. 15 is a simplified schematic diagram showing a configuration of an apparatus for manufacturing a coated film according to the application example 1.

FIG. 14 is a simplified schematic diagram showing the configuration of the apparatus for manufacturing the coated film according to the first embodiment, and FIG. 15 is a simplified schematic diagram showing a configuration of an apparatus for manufacturing a coated film according to the present application example.

In the first embodiment, the surface (first surface) of the base material 1 is subjected to the coating processing (see FIG. 14), but both surfaces of the base material 1 may be subjected to the coating processing as shown in FIG. 15. In this case, since the coating film is also formed on the back surface of the base material 1, it is preferable to provide the suction roll SR on the upstream side from the coating processing unit (20). Further, it is preferable to perform the corona processing on both surfaces of the base material 1 in the surface processing unit (10).

Note that the suction roll SR may be provided on the upstream side from the coating processing unit (20) (between 20 and UW) in the first embodiment (FIG. 1, FIG. 14).

Application Example 2

Figure 16:
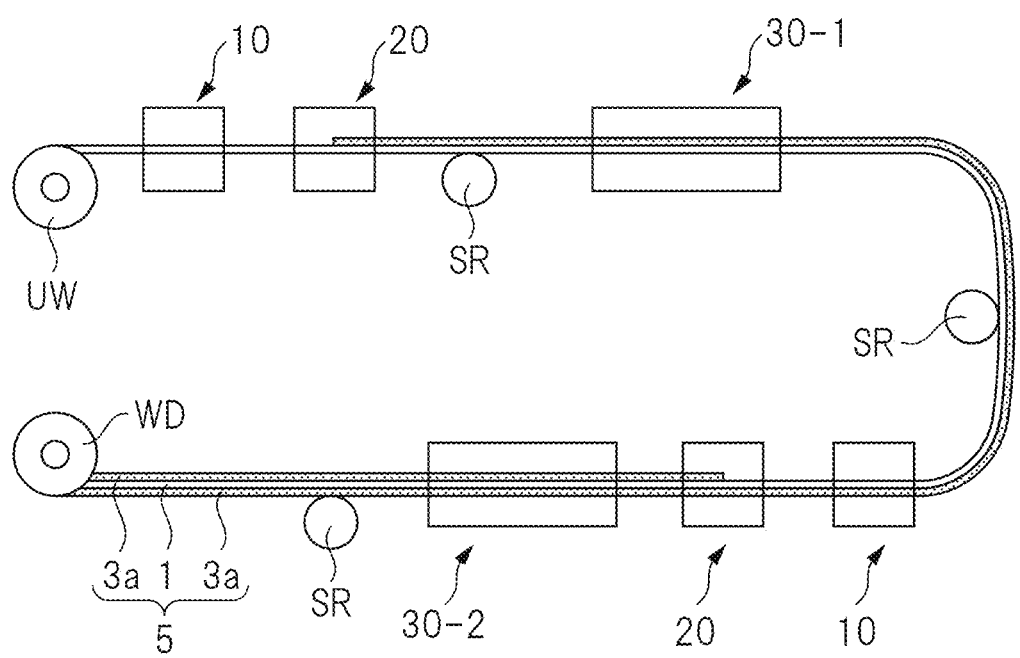
FIG. 16 is a simplified schematic diagram showing a configuration of an apparatus for manufacturing a coated film according to the application example 2.

FIG. 16 is a simplified schematic diagram showing a configuration of an apparatus for manufacturing a coated film according to the present application example. In the application example 1, both surfaces are subjected to the coating processing in one coating processing unit (20) and both surfaces are simultaneously dried in one drying processing unit (30). However, the coating processing and the drying processing may be sequentially performed for each of the both surfaces as shown in FIG. 16. Specifically, first, a coating film is provided on the front surface (first surface) of the base material 1 and dried by a drying processing unit (30-1), and then another coating film is provided on the back surface (second surface) of the base material 1 and dried by another drying processing unit (30-2). The surface processing may also be sequentially performed for each of the both surfaces. In this case, it is preferable to arrange the suction roll between the two drying processing units (30-1, 30-2), before the drying processing unit (30-1), and after the drying processing unit (30-2). Note that the drying processing unit (30-1) and the drying processing unit (30-2) may be coupled.

Application Example 3

Figure 17:
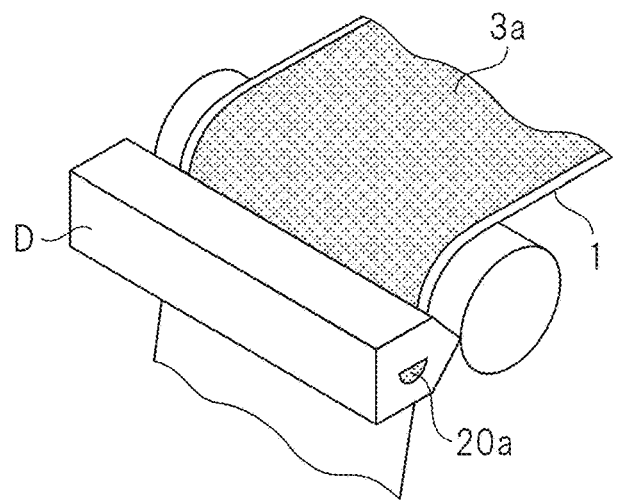
FIG. 17 is a perspective view showing a state of the coating using a slot die.
Figure 17:
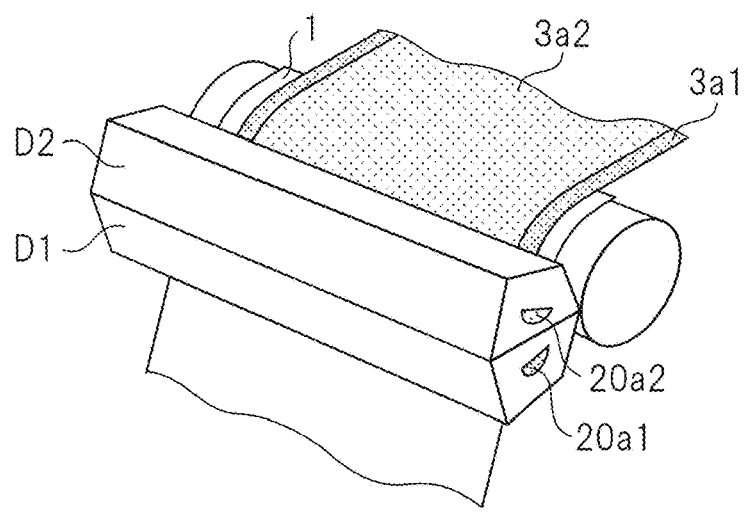
Figure 17:
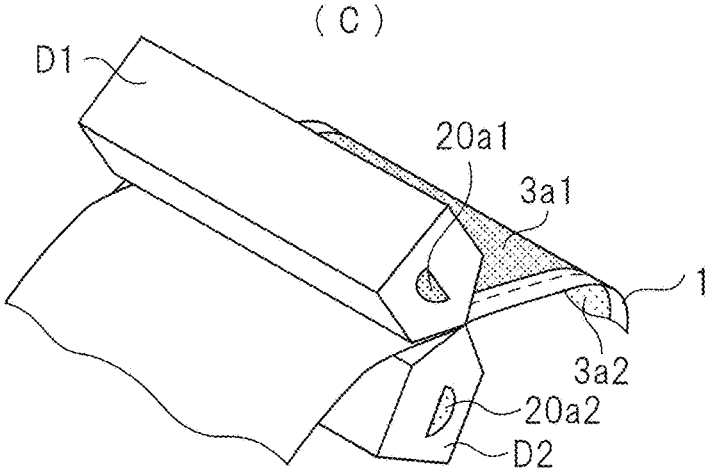

In the first embodiment (FIG. 1, FIG. 6), the gravure coating device is used as a coating device, but another coating device may be used. FIG. 17 is a perspective view showing a state of the coating using a slot die.

For example, in the slot die of FIG. 17(A), the coating film 3a is formed by applying the coating liquid 20a from a manifold inside a die D onto the base material 1 through a slit (discharge unit) at the tip of the die.

Also, in the slot die of FIG. 17(B), a first die D1 for first coating liquid and a second die D2 for second coating liquid are provided, and the first coating liquid 20a1 and the second coating liquid 20a2 are sequentially applied onto the base material 1, so that a laminated film of a first coating film 3a1 and a second coating film 3a2 is formed.

Further, in the slot die of FIG. 17(C), the first die D1 for first coating liquid is arranged on the front surface side of the base material 1 and the second die D2 for second coating liquid is arranged on the back surface side of the base material 1, so that the first coating film 3a1 is formed on the front surface (first surface) of the base material 1 and the second coating film 3a2 is formed on the back surface (second surface) of the base material 1. Namely, both surfaces of the base material 1 can be coated.

In addition, the laminated film of the first coating film 3a1 and the second coating film 3a2 may be formed by preparing two gravure coating devices of the first embodiment. Further, the coating processing may be performed for both surfaces by arranging the gravure coating device of the first embodiment on both the front surface side and the back surface side of the base material 1.

Application Example 4

In the first embodiment (FIG. 1), a suction roll is used as a roll for tension cut (roll for tension control), but another roll capable of tension cut by one-sided contact may be used.

As such a roll, in addition to the suction roll, an electrostatic adsorption roll or an air blowing roll can be used. In the electrostatic adsorption roll, the base material 1 is adsorbed by electrostatic adsorption, and in the air blowing roll, the base material 1 and the roll are brought into close contact with each other by blowing gas to the roll.

Application Example 5

In the first embodiment (FIG. 1, FIG. 8), a nozzle for discharging heated air is used for the drying processing, but the drying processing may be performed by a heater such as an infrared (IR) heater.

Application Example 6

In the first embodiment (FIG. 2), one kind of coating liquid 20a is applied on the base material 1, but another coating liquid may be further applied. Namely, the coating layer may have a multilayer structure (see FIG. 17(B) and the like). When forming the coating layer having a multilayer structure, the drying processing may be performed for each layer, or may be collectively performed at once.

Application Example 7

In the first embodiment (FIG. 1), a scroll-shaped (rolled strip-shaped) base material 1 is used, and the base material 1 unwound from the unwinding unit is conveyed to the processing unit. However, the shape of the base material 1 can be changed as appropriate, and any shape can be adopted as long as it can be conveyed from the unloading unit (conveyor unit) to the processing unit. Further, even after the processing of the base material 1, it is not always necessary to wind the base material 1, and the base material 1 may be conveyed to, for example, a battery assembling apparatus.

Application Example 8

In the first embodiment (FIG. 8), the improvement of the temperature control is described by taking the drying chamber 1D on the most upstream side as an example, but the same improvement may be applied also to the other drying chambers 2D and 3D. However, the drying chamber 1D on the most upstream side is greatly affected by the accompanied flow, and applying the improvement of temperature control to the drying chamber 1D is effective.

Further, in the first embodiment (FIG. 8), the nozzle is provided at the center of the drying chamber, but the position of the nozzle is not limited and the nozzle may be arranged at another position. Also, a plurality of nozzles may be used, and in this case, a thermocouple (temperature sensor) is preferably arranged between the nozzle located on the most upstream side and the side wall of the drying chamber (cover) on the upstream side (region 1A).

Application Example 9

The position and number of rolls (guide rolls) R in the first embodiment (FIG. 1) can be changed as appropriate.

In the foregoing, the invention made by the inventors of the present invention has been concretely described based on the embodiments and examples. However, it is needless to say that the present invention is not limited to the foregoing embodiments and examples and various modifications can be made within the range not departing from the gist thereof.

REFERENCE SIGNS LIST 1 base material
1a micropore
1A region
1D drying chamber
2D drying chamber
3a coating film
3a1 first coating film
3a2 second coating film
3b coating layer
3D drying chamber
5 separator
10 corona discharge irradiation device (surface processing unit)
20 gravure coating device (coating equipment, coating processing unit)
20a coating liquid
20b chamber (tank)
20c blade
30 drying oven (drying processing unit)
30-1 drying processing unit
30-2 drying processing unit
31a nozzle
31b thermocouple
101 positive electrode material
103 negative electrode material
106 can
AF accompanied flow
BA region having a fan-shaped cross section
CR coating roll
D die
D1 first die D2 second die
DA heated dry air
P hole
R roll (guide roll)
R1 nip roll (roll)
R2 nip roll (roll)
S1 twin-screw kneading extruder
S2 die
S3 raw fabric cooling device
S4 first stretching device
S5 second stretching device
S6 extraction tank
S7 third stretching device
S8 winding device
SR suction roll
UW unwinding unit (winding device)
WD winding unit (winding device)

The invention claimed is:

1. A system for manufacturing a coated film comprising:
an unloader from which a base material is taken out;
a coating liquid applicator, the coating liquid applicator being disposed to apply the coating liquid to a first surface of the base material;
a drying unit configured to form a coating layer on the first surface of the base material by drying the coating liquid on the base material; and
a loader to which the base material having the coating layer formed thereon is loaded,
wherein the base material on which the coating layer has been formed is a separator for a battery,
wherein a film thickness of the base material is less than 9 μm,
wherein a first suction roll is arranged between the unloader and the drying unit,
wherein a second suction roll is arranged between the drying unit and the loader,
wherein the drying unit includes a drying chamber in which a heating fluid is introduced from a nozzle,
wherein the nozzle is arranged at a center of the drying chamber,
wherein the heating fluid is introduced into the drying chamber so as to spray onto the base material from the nozzle,
wherein a temperature of the drying chamber is controlled by a temperature sensor arranged between the nozzle and a first side wall of the drying chamber, the first side wall being arranged on an upstream side of the nozzle in a conveyance direction of the base material, and
wherein the nozzle which is arranged at the center of the drying chamber is a closest nozzle to the first side wall among other nozzles or an only nozzle located in the drying chamber.

2. The system for manufacturing the coated film according to claim 1,
wherein a suction pressure of each of the first suction roll and the second suction roll is 3 Mpa or less.

3. The system for manufacturing the coated film according to claim 1,
wherein the base material is a porous film.

4. The system for manufacturing the coated film according to claim 1,
wherein a film thickness of the base material is 7 μm or less, and a loading tension in the loader is less than 12 N.

5. The system for manufacturing the coated film according to claim 1,
wherein a loading speed of the base material in the loader is 30 m/min or more.

6. The system for manufacturing the coated film according to claim 1,
wherein a temperature of the drying unit is less than 75° C.

7. The system for manufacturing the coated film according to claim 1,
wherein the coating liquid applicator is part of a coating unit that includes a chamber for storing the coating liquid and a coating roll, and
wherein the chamber is arranged sideways.

* * * * *